United States Patent [19]

Gregory et al.

[11] Patent Number: 5,779,778
[45] Date of Patent: Jul. 14, 1998

[54] INK COMPOSITION CONTAINING A MIXTURE OF BENZODIFURANONE DYES

[75] Inventors: Peter Gregory; Alan Thomas Leaver, both of Manchester, United Kingdom

[73] Assignee: Zeneca Limited, London, England

[21] Appl. No.: 831,935

[22] Filed: Apr. 2, 1997

[30] Foreign Application Priority Data

Apr. 25, 1996 [GB] United Kingdom .................... 9608491

[51] Int. Cl.$^6$ .................................................. C09D 11/02
[52] U.S. Cl. ................................. 106/31.27; 106/31.57; 427/394
[58] Field of Search ........................ 106/31.27, 31.57; 427/394

[56] References Cited

U.S. PATENT DOCUMENTS

5,665,150  9/1997  Schwarz .......................... 106/31.27

FOREIGN PATENT DOCUMENTS

| 0 033 583 | 8/1981 | European Pat. Off. . | |
|---|---|---|---|
| 0 146 269 | 6/1985 | European Pat. Off. . | |
| 0 146 269 A3 | 6/1985 | European Pat. Off. | C07D 493/04 |
| 0 252 406 | 1/1988 | European Pat. Off. . | |
| 0 363 034 | 4/1990 | European Pat. Off. . | |
| 0 492 893 A2 | 7/1992 | European Pat. Off. | C09B 67/22 |
| 0 574 148 A1 | 12/1993 | European Pat. Off. | C09B 57/00 |
| 0 598 303 A1 | 5/1994 | European Pat. Off. | D06P 3/54 |
| WO 97/04031 | 2/1997 | WIPO | C09B 67/22 |

OTHER PUBLICATIONS

*Research Disclosure,* "Toner–Compositions Containing Benzodifuranone Dyes", Jan. 1993, vol. 345, Article 34557, pp. 39–40.
Research Disclosure 34557, Jan. 1993.

*Primary Examiner*—Helene Klemanski
*Attorney, Agent, or Firm*—Pillsbury Madison & Sutro LLP

[57] ABSTRACT

An ink composition comprising:

(i) a medium comprising a low melting point solid, an organic solvent, or a mixture of water and one or more water-soluble organic solvent(s); and (ii) from 0.5 to 20% based on the total weight of the ink composition of at least one dye selected from a dye of Formula (1), a dye of Formula (2) and a dye of Formula (3) or a mixture thereof:

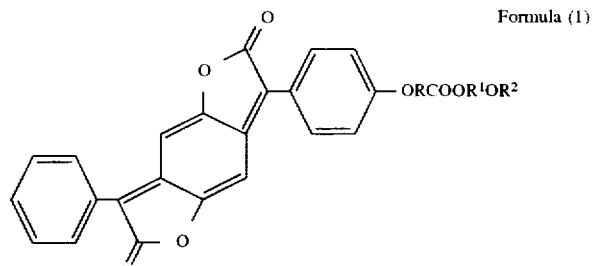

Formula (1)

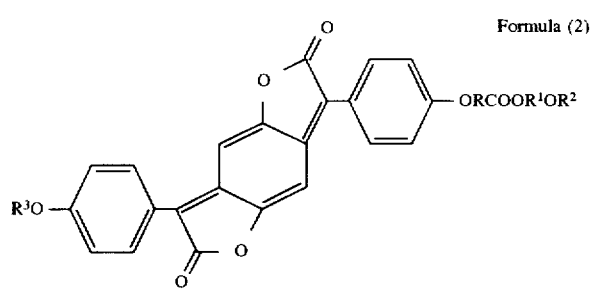

Formula (2)

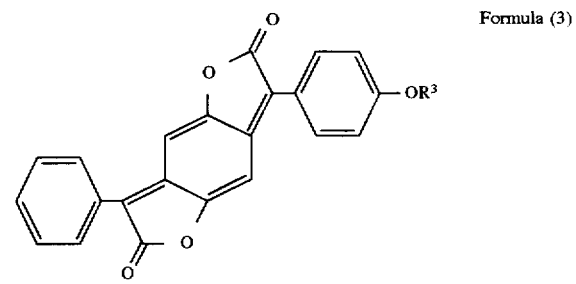

Formula (3)

wherein:

R and $R^1$ each independently represent an alkylene group; and $R^2$ and $R^3$ each independently represent an alkyl group.

Also claimed is a process for ink jet printing of textiles using the inks, a process for ink jet printing a substrate with the inks and a toner resin composition containing a dye of Formula (1), (2) or (3) or a mixture thereof.

11 Claims, No Drawings

INK COMPOSITION CONTAINING A MIXTURE OF BENZODIFURANONE DYES

The present invention relates to compositions and solutions thereof, suitable for use in printing and imaging technologies, especially those suitable for coloration of substrates such as paper, plastics, textiles, metal and glass by printing processes such as ink jet printing and those suitable for use in electrophotography such as toners.

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good waterfastness, light fastness and optical density, have fast fixation to the substrate and cause no clogging of the nozzle.

Electrophotographic copiers or printers generally comprise an organic photoconductor (OPC) and a developer or toner. The OPC generally comprises an electrically conducting support, a charge generating layer and a charge transport layer. The electrically conducting support is a metal drum, typically an aluminium drum, or a metallised polymer film, typically aluminised polyester. The charge generating layer comprises a charge generating material (CGM) and a binder resin, typically a polycarbonate. The charge transport later comprises a charge transport material (CTM) and a binder resin, typically a polycarbonate. The developer or toner comprises a toner resin, a colorant and optionally a charge control agent (CCA). The toner resin is typically a styrene or substituted styrene polymer or styrene-butadiene copolymer. The colorant is typically a dye or pigment or mixture thereof.

According to a first aspect of the present invention there is provided an ink composition comprising:

(i) a medium comprising a low melting point solid, an organic solvent, or a mixture of water and one or more water-soluble organic solvent(s); and (ii) from 0.5 to 20% based upon the total weight of the ink of at least one dye selected from a dye of Formula (1), a dye of Formula (2) and a dye of Formula (3) or a mixture thereof:

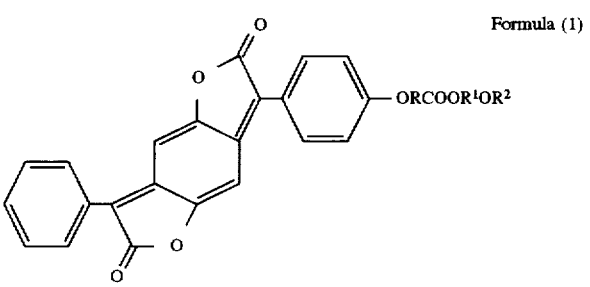

Formula (1)

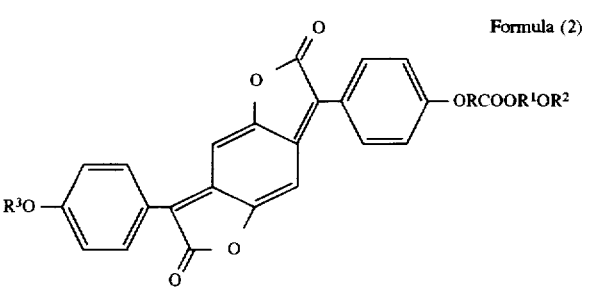

Formula (2)

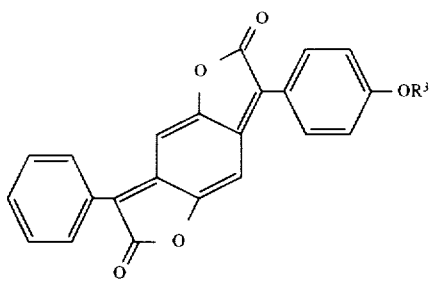

Formula (3)

wherein:

R and $R^1$ each independently represent an alkylene group; and $R^2$ and $R^3$ each independently represent an alkyl group.

The alkylene groups represented by R and $R^1$ are preferably independently $C_{1-8}$-alkylene groups, more preferably $C_{1-6}$-alkylene groups and especially $C_{1-4}$-alkylene groups. It is especially preferred that R is methylene and $R^1$ is methylene or ethylene.

The alkyl groups represented by $R^2$ and $R^3$ are preferably $C_{1-8}$-alkyl groups more preferably $C_{1-6}$-alkyl groups and especially $C_{1-4}$-alkyl groups. It is especially preferred that $R^2$ is methyl or ethyl and $R^3$ is propyl, especially n-propyl.

When a mixture of dyes of Formulae (1) to (3) is present in the ink the mixture preferably comprises, on a weight basis, from 5 to 70% of the dye of Formula (1), from 5 to 70% of a dye of Formula (2) and from 0 to 40% of a dye of Formula (3). The dye mixture more preferably comprises from 5% to 70%, especially from 10% to 30%, by weight of the dye of Formula (1), from 5% to 70%, especially from 40% to 60%, by weight of the dye of Formula (2) and from 5% to 40%, especially from 10% to 35%, by weight of the dye of Formula (3).

An especially preferred dye mixture comprises from 16% to 21% by weight of the dye of Formula (1), from 50% to 55% by weight of the dye of Formula (2) and from 26% to 31% by weight of the dye of Formula (3).

An especially preferred mixture of dyes comprises a dye of Formula (1) in which R is —$CH_2$—, $R^1$ is —$C_2H_4$— and $R^2$ is —$C_2H_5$, a dye of Formula (2) in which R is —$CH_2$—, $R^1$ is —$C_2H_4$—, $R^2$ is —$C_2H_5$ and R is n-propyl and a dye of Formula (3) in which $R^3$ is n-propyl.

The mixture of dyes may a be simple physical mixture or may be mixed crystals formed, for example, by co-crystallisation or co-synthesis. Crystalline modifications of compounds of Formulae (1), (2) and (3) exist and it is intended that the present definition includes such crystalline modifications which may be formed by established treatments such as heat treatment, solvent treatment, recrystallisation or seeding.

The dyes of Formulae (1), (2) and (3) may be prepared using analogous methods to those described in the art for other similar benzodifuranone compounds, for example, by the processes described in EP 0033583 and EP 0146269.

The ink compositions of the present invention contain from 0.5% to 20%, preferably from 0.5% to 15%, and especially from 1% to 3%, by weight of the dye of Formula (1), (2) or (3) or a mixture thereof, based on the total weight of the ink.

It is preferred that the dye of Formula (1), (2) or (3) or mixture thereof is finely dispersed or, more preferably, dissolved completely in the medium to form a solution.

When the liquid medium is a mixture of water and one or more water-soluble organic solvent(s) the weight ratio of water to water-soluble organic solvent(s) is preferably from 98:2 to 2:98, more preferably from 98:2 to 50:50 and especially from 95:5 to 80:20.

The water-soluble organic solvent(s) is preferably selected from $C_1$-4-alkanols, for example methanol, ethanol, n-propanol, isopropanol, n-butanol, sec-butanol, tert-butanol and isobutanol; cyclic alkanols, for example cyclohexanol and cyclopentanol; amides, for example dimethylformamide or dimethylacetamide; ketones or ketone-alcohols, for example acetone or diacetone alcohol; ethers, for example tetrahydrofuran or dioxane; oligo- or poly-alkyleneglycols, for example diethylene glycol, triethylene glycol, polyethylene glycol and polypropylene glycol; alkyleneglycols or thioglycols containing a $C_2$–$C_6$-alkylene group, for example ethylene glycol, propylene glycol, butylene glycol, pentylene glycol, hexylene glycol and thiodiglycol; polyols, for example glycerol or 1,2,6-hexanetriol; $C_{1-4}$-alkyl-ethers of polyhydric alcohols, for example 2-methoxyethanol, 2-(2-methoxyethoxy)ethanol, 2-(2-ethoxyethoxy)-ethanol, 2-[2-(2-methoxyethoxy)ethoxy] ethanol, and 2-[2-(2-ethoxyethoxy)-ethoxy]-ethanol; heterocyclic ketones, for example 2-pyrrolidone and N-methyl-2-pyrrolidone; or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methyl-pyrrolidone; alkylene- and oligo-alkylene-glycols, for example ethyleneglycol, diethyleneglycol, triethyleneglycol; and lower alkyl ethers of polyhydric alcohols, for example or 2-methoxy-2-ethoxy-2-ethoxyethanol; and polyethyleneglycols with a molecular weight of up to 500. A preferred specific solvent mixture is a binary or ternary mixture of water and diethylene glycol and/or, 2-pyrrolidone or N-methylpyrrolidone in weight ratios 75–95:25–5 and 60–80:0–20:0–20 respectively.

When the medium is a mixture of one or more water-soluble solvent(s), it preferably also contains humectant to inhibit evaporation of water and preservative to inhibit the growth of fungi, bacteria and/or algae in the solution. Examples of suitable humectants are, propan-1,2-diol, butan-1,2-diol, butan-2,3-diol and butan-1,3-diol, urea, caprolactam and polyethylene glycols.

When the medium comprises water and one or more water-soluble organic solvent(s) the ink composition preferably contains a dispersing agent and a defoamer.

Suitable dispersing agents include for example, lignosulphonates, a naphthalene sulphonic acid/formaldehyde condensate and a phenol/cresol/sulphanilic acid/formaldehyde condensates. The dispersing agent is preferably present at from 0.25 to 20% based upon the total weight of the ink composition.

Suitable defoamers include for example, nonanol and silicon based mineral oils. The defoamer is preferably present at from 0.05 to 2% based upon the total weight of the ink composition.

In view of the foregoing preferences a preferred ink composition comprises:

(a) 0.5 to 20 parts of the dye of Formula (1), (2) or (3) or a mixture thereof;

(b) 2 to 60 parts of water-soluble organic solvent(s);

(c) 1 to 15 parts water;

(d) 0.5 to 20 parts of dispersing agent; and (e) 0.05 to 2 parts defoamer;

wherein the parts (a)+(b)+(c)+(d)+(e)=100.

In addition to the parts (a) to (e) the ink may contain other components conventionally used in ink jet ink formulations, for example a biocide, surfactants, viscosity modifiers, corrosion inhibitors and kogation reducing additives.

Examples of further suitable ink media are given in U.S. Pat. Nos. 4,963,189, 4,703,113, 4,626,284 and EP 425,150 which are incorporated herein by reference thereto.

When the liquid medium is an organic solvent the solvent is preferably selected from ketones, alkanols, aliphatic hydrocarbons, esters, ethers, amides or mixtures thereof. Where an aliphatic hydrocarbon is used as the solvent a polar solvent such as an alcohol, ester, ether or amide is preferably added. Preferred organic solvents include ketones, especially methyl ethyl ketone and alkanols especially ethanol and n-propanol.

When the liquid medium is an organic solvent it is desirable that the dye has a solubility of around 10% or more to allow the preparation of concentrates which may be used to prepare more dilute inks and to minimise the chance of precipitation of colorant if evaporation of the liquid medium occurs during use of the ink.

Organic solvent based ink compositions are used where fast drying times are required and particularly when printing onto hydrophobic substrates such as plastics, metal or glass.

When the medium for an ink composition is a low melting point solid the melting point of the solid is preferably in the range from 60° C. to 125° C. Suitable low melting point solids include long chain fatty acids and alcohols, preferably those with $C_{18-24}$ chains, or sulphonamides. The dye of Formula (1), (2) or (3) or mixtures thereof may be dissolved in the low melting point solid or may be finely dispersed in it.

It is preferred that the medium comprises mixture of water and one or more water-soluble organic solvent(s).

It is preferred that the pH of the ink composition is less than 7, more preferably in the range of from 2 to 6.5 and especially from 4 to 6.

According to a second aspect of the present invention there is provided a process for printing a substrate with an ink composition using an ink jet printer, characterised in that the ink composition is as defined for the first aspect of the present invention.

A suitable process for the application of an ink composition as hereinbefore described comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

The substrate used in the ink jet printing process is preferably paper, a plastic, a textile material, metal or glass and is more preferably paper, a plastic or a textile material.

Preferred textile materials are natural, semi-synthetic or synthetic materials.

Examples of natural textile materials include wool, silk, hair and cellulosic materials, particularly cotton, jute, hemp, flax and linen. Examples of synthetic and semi-synthetic materials include polyamides, polyesters, polyacrylonitriles and polyurethanes.

Preferred papers are plain and treated papers which may have an acid, alkaline or neutral character.

Especially preferred substrates include overhead projector slides, plain and treated papers and synthetic or semi-synthetic textile materials such as polyester.

The preferred ink compositions used in the process is as hereinbefore described.

According to a third aspect of the present invention there is provided a paper, an overhead projector slide or a textile material printed with an ink composition according to the first aspect of the present invention or by means of the process according to the third aspect of the present invention.

According to a fourth aspect of the present invention there is provided a process for the coloration of a textile material with an ink composition according to the first aspect of the present invention which comprises the steps:

i) applying the ink composition to the textile material by ink jet printing; and ii) heating the textile material at a temperature from 50° C. to 250° C. to fix the dye on the material.

The process for coloration of a textile material by ink jet printing preferably comprises a pre-treatment of the textile material with an aqueous pretreatment composition comprising a water-soluble acid and a thickening agent followed by removing water from the pre-treated textile material to give a dry pre-treated textile material which is subjected to ink jet printing in step i) above.

The thickening agent may be any thickening agent suitable for use in the preparation of print pastes for the conventionl printing of cellulose reactive dyes. Suitable thickening agents include alginates, especially sodium alginate, xantham gums, monogalactam thickners, polysaccharide and cellulosic thickeners. The amount of the thickening agent can very within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pre-treatment composition.

The acid is present in the pre-treatment composition to provide a pH of less than 7, preferably a pH in the range of 2 to 6, on the surface of the fabric. The acidic medium on the fabric surface ensures that the dye chromophore is not decomposed during the dyeing process, as can be the case if the pH exceeds 7. It is preferred that the acid is a non volatile acid, more preferably a non volatile organic acid such as citric acid or tartaric acid. The acid is present in the pre-treatment composition at a concentration sufficient to give a pH in the range of 2 to 6. When the acid is citric or tartaric acid it is convenient to use from 1% to 5% of acid based upon the total weight of the pre-treatment composition.

The remainder of the pre-treatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents are cationic polymers, such as a 50% aqueous solution of a dicyanamide/phenol formaldehydelammonium chloride condensate e.g. MATEXIL™ FC-PN (available from ICI), which have a strong affinity for the textile material and dye.

Examples of anti-migration agents are low molecular weight acrylic resins, e.g. polyacrylates, such as poly(acrylic acid) and poly(vinyl acrylate).

In the pre-treatment stage of the present process the pre-treatment composition is preferably evenly applied to the textile material. Where a deeply penetrated print or a deep shade is required the pre-treatment composition is preferably applied by a padding or similar process so that it is evenly distributed throughout the material. However, where only a superficial print is required the pretreatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the dye on the textile material as this has been found to minimise the diffusion of the dye from printed to non-printed regions. As with the pretreated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes in order to fix the dye on the textile material. If a steam (wet) heat treatment is used, the printed material is preferably maintained at 100°–105° C. for from 5 to 15 minutes whereas if a dry heat treatment is employed the printed material is preferably maintained at 140°–160° C. for from 2 to 8 minutes.

After allowing the textile material to cool, unfixed dye and other ingredients of the pretreatment and dye compositions may be removed from the textile material by a washing sequence, involving a series of hot and cold washes in water and aqueous detergent solutions before the textile material is dried.

Preferred textile materials for use in the process according to the fourth aspect of the present invention are as hereinbefore defined for the second aspect of the present invention.

According to a fifth aspect of the present invention there is provided a textile material, especially a synthetic or semisynthetic textile material, coloured by means of the process according to fourth aspect of the present invention.

According to a sixth aspect of the present invention there is provided a toner resin composition comprising a toner resin and a dye characterised in that the dye is selected from a dye of Formula (1), (2) and (3) or a mixture thereof as hereinbefore defined.

The toner resin is preferably a thermoplastic resin for example, a styrene or substituted styrene polymer or copolymer, for example, a polystyrene or styrene-butadiene copolymer, especially a styrene-acrylic copolymer, for example, a styrene-butyl methacrylate copolymer. Other suitable toner resins include polyesters, polyvinylacetate, polyalkenes, polyvinylchloride, polyurethanes, polyamides, silicones, epoxyresins and phenolic resins. Examples of toner resins are given in Electrophotography by R. M. Scharfert (Focal Press), U.S. Pat. No. 5,143,809, UK 2090008, U.S. Pat. Nos. 4,206,064 and 4,407,928 which are incorporated herein by reference thereto.

The toner resin composition preferably contains from 0.1% to 20% of the dye mixture of dyes more preferably from 3% to 10% based on the total weight of the toner resin compositions.

The toner resin composition may be prepared by any method known to the art which typically involves mixing the toner resin with an optional charge control agent (CCA) and the dye of Formula (1), (2) or (3) or a mixture thereof by kneading in a ball mill above the melting point of the resin. Generally, this involves mixing the molten toner resin composition for several hours at temperatures from 120° to 200° C., in order to uniformly distribute the optional CCA and dye throughout the toner resin. The toner resin is then cooled, crushed and micronised until the mean diameter of the particles is preferably below 20 μm and, for high resolution electro-reprography, more preferably from 1 to 10 μm. The powdered toner resin composition so obtained may be used directly or may be diluted with an inert solid diluent such as fine silica by mixing for example in a suitable blending machine.

The CCA is optionally present in the toner at from 0.1 to 5% based upon the total weight of the toner.

The CCA may be any known positive or negative charge control agent. Examples of negative charge control agents include metal complexes of azo dyes, preferably 2:1 complexes with chromium (III), cobalt (III) and iron (III). Preferred azo dyes are 1-phenylazo-2-naphthol dyes. Examples of positive CCA's include nigrosine dyes, phenazines, triphenylmethane dyes, 2:1 chromium complexes of an aromatic orthohydroxycarboxylic acid such as BONTRON™ E81 and BONTRON™ E82 (commercially available from Orient Chemical Industries) and alkyl pyridinium halides such as cetyl pyridinium chloride. It is preferred that the CCA used in the toner is colourless or substantially colourless such that the colour of the toner is not markedly effected by the presence of the CCA.

Further suitable examples of CCA's are described in WO 94/23344 which is incorporated herein by reference thereto.

The invention is further illustrated by the following Examples in which all parts and percentages are by weight unless otherwise stated.

EXAMPLE 1

Dyes (1) to (3) may be prepared using analogous methods to those described in EP 0.033.583 and EP 0.146.269:

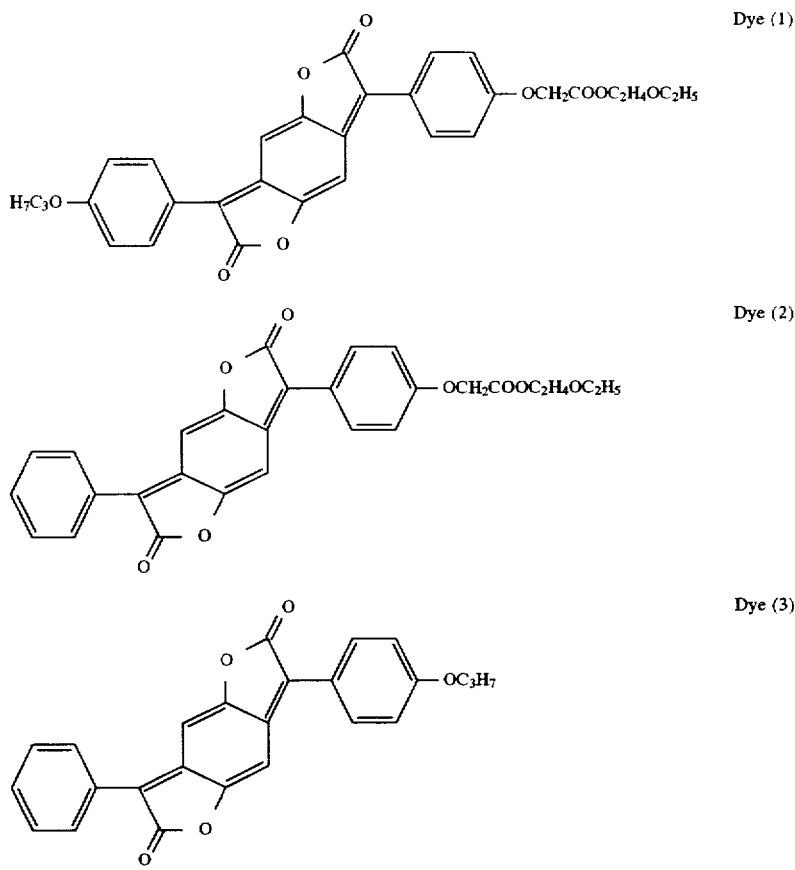

EXAMPLE 2

A coloured toner was prepared comprising 2 parts of a dye of the formula:

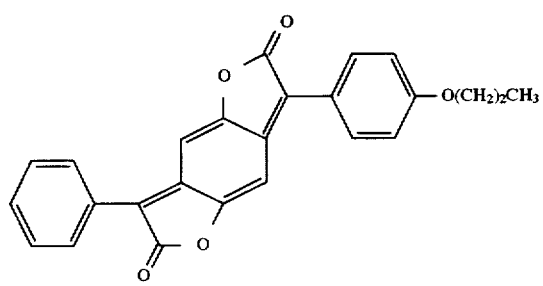

and 98 parts of a polyester resin (T-500, ex. Image Polymers).

The dye and resin were mixed together and then heated and stirred at a temperature of 150° to 200° C. The resulting dyed resin was allowed to cool and was then ground to a fine powder. This was classified to give a toner with a particle size distribution of 50% of particles of 8 microns or less. (measured using a Coulter Counter Particle Size Analyser. available from Coulter Electronics).

The toner was then printed onto plain paper using a laser printer.

The glass transition temperature of the toner was 55.2° C., compared with 54.3° C. for the resin alone. This illustrates that the dye did not markedly affect the physical properties of the toner and is, therefore, particularly suitable for use in a toner. Often the incorporation of dyes in a resin will result in a significant reduction in the glass transition temperature which can give an image with poor definition and colour to colour bleed on the printed substrate.

Colour space measurements on the prints were taken using a CIE Lab System which gave the following colour space coordinates:

L=45.7, a=57.2, b=−9.3, c=57.9, H=350.8

EXAMPLE 3

The following ink compositions containing the dyes described in Example 1 may be prepared according to the formulations shown in Table 1 wherein the figures denote parts by weight based upon the total weight of the ink composition.

In Table 1 Formulations A and B refer to the following ink media wherein the parts are by weight based upon the total weight of the ink composition:

| Formulation A | |
|---|---|
| Glycerol | 10.0 parts; |
| 2-pyrrolidone | 5.0 parts; |
| Nonanol (defoaming agent) | 0.5 parts; |
| Lignosulphonate (dispersing agent) | 5.0 parts; and |
| Proxel ™ GXL (a biocide available from Zeneca Limited) | 0.1 parts. |
| Formulation B | |
| Ethylene glycol | 10 parts; |
| N-methylpyrrolidone | 5 parts; |
| Sodium Dispersol (a dispersing agent available from Zeneca Limited) | 5 parts; |
| Proxel ™ GXL | 0.1 parts; and |
| Nonanol | 0.5 parts. |

Each ink composition shown in Table 1 has 100 parts, the balance being water (i.e. 100-dye parts-formulation parts).

TABLE 1

| Dye No. | No. Parts of Dye | Formulation | Balance of water (Parts) |
|---|---|---|---|
| 1 | 5 | A | 74.4 |
| 1 | 10 | A | 69.4 |
| 1 | 2 | B | 77.4 |
| 1 | 5 | B | 74.4 |
| 1 | 8 | B | 71.4 |
| 2 | 5 | A | 74.4 |
| 2 | 6 | A | 73.4 |
| 2 | 3 | B | 76.4 |
| 3 | 2.5 | A | 76.9 |
| 3 | 8.9 | B | 70.5 |
| 3 | 10.0 | A | 69.4 |
| 2 | 1.5 | A | 77.9 |
| 1 | 3.6 | B | 75.8 |
| 3 | 7.0 | A | 72.4 |

We claim:

1. An ink composition comprising:
(i) a medium comprising a low melting point solid or a mixture of water and one or more water-soluble organic solvent(s) in a weight ratio of water:water-soluble organic solvent of from 98:2 to 50:50; and
(ii) from 0.5 to 20% based on the total weight of the ink composition of a mixture of dyes comprising on a weight basis from 5 to 70% of a dye of Formula (1), from 5 to 70% of a dye of Formula (2) and from 0 to 40% of a dye of Formula (3):

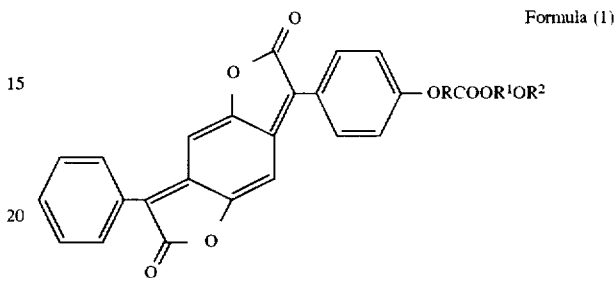

Formula (1)

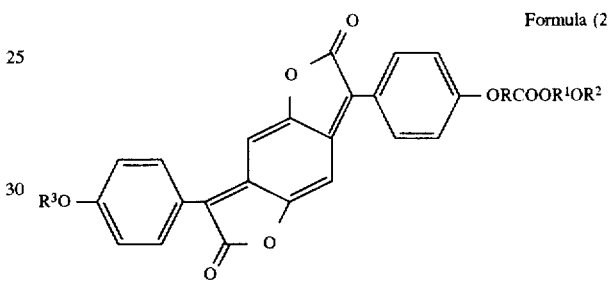

Formula (2)

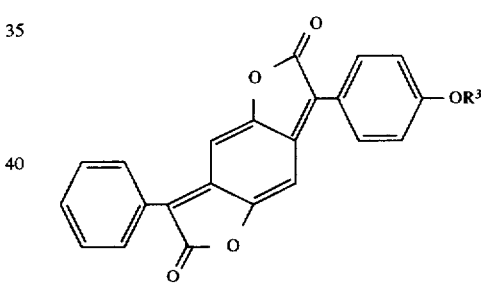

Formula (3)

wherein:
R and $R^1$ each independently represent an alkylene group; and
$R^2$ and $R^3$ each independently represent an alkyl group.

2. An ink according to claim 1 wherein the mixture of dyes comprises from 5% to 70% by weight of the dye of Formula (1), from 5% to 70% by weight of the dye of Formula (2) and from 5% to 40% by weight of the dye of Formula (3).

3. An ink composition according to claim 1 wherein the medium comprises water and one or more water soluble organic solvent(s) in a weight ratio of water:water-soluble organic solvent of from 95:5 to 80:20.

4. An ink composition according to claim 1 comprising:
(a) 0.5 to 20 parts of the mixture of dyes;
(b) 2 to 60 parts of water-soluble organic solvent(s);
(c) 1 to 15 parts water;
(d) 0.5 to 20 parts of dispersing agent; and
(e) 0.05 to 2 parts defoamer;
wherein the parts (a)+(b)+(c)+(d)+(e)=100.

5. An ink composition according to claim 1 wherein the ink composition has a pH of less than 7.

6. An ink jet printing process for printing a substrate with an ink composition comprising forming the ink into small droplets by ejection from a reservoir through a small orifice so that the droplets of ink are directed at the substrate wherein the ink composition is as defined in claim 1.

7. A paper, an overhead projector slide or a textile material printed by means of the process according to claim 6.

8. A process for the coloration of a textile material with an ink composition as defined in claim 1 which comprises the steps:

i) applying the ink composition to the textile material by ink jet printing; and ii) heating the textile material at a temperature from 50° C. to 250° C. to fix the dye on the material.

9. A textile material coloured by means of the process according to claim 8.

10. A toner resin composition comprising a toner resin and a mixture of dyes comprising on a weight basis from 5 to 70% of a dye of Formula (1), from 5 to 70% of a dye of Formula (2) and from 0 to 40% of a dye of Formula (3), wherein said dyes are as defined in claim 1.

11. A toner according to claim 10 wherein the mixture of dyes comprises from 5% to 70% by weight of the dye of Formula (1), from 5% to 70% by weight of the dye of Formula (2) and from 5% to 40% by weight of the dye of Formula (3).

* * * * *